United States Patent [19]
Maruyama et al.

[11] Patent Number: 6,108,165
[45] Date of Patent: Aug. 22, 2000

[54] ROTARY DRUM EQUIPMENT AND RECORDING/REPRODUCING EQUIPMENT USING THE SAME

[75] Inventors: Hideki Maruyama; Kenmei Masuda, both of Yokohama; Kuniaki Hirayama, Hitachinaka; Yoshio Uemura, Hitachinaka; Toshihiko Imachi, Hitachinaka; Kenkichi Inada, Hitachinaka; Toshio Tsuchiya, Hitachinaka, all of Japan

[73] Assignee: Hitachi, Ltd., Tokyo, Japan

[21] Appl. No.: 09/199,160

[22] Filed: Nov. 25, 1998

[30] Foreign Application Priority Data

Nov. 28, 1997 [JP] Japan ................................. 9-327533

[51] Int. Cl.[7] .............................. G11B 5/53; G11B 15/61
[52] U.S. Cl. .................................... 360/107; 360/130.24
[58] Field of Search ................................ 360/107, 130.24

[56] References Cited

U.S. PATENT DOCUMENTS

| | | | |
|---|---|---|---|
| 4,823,222 | 4/1989 | Magnusson | 360/130.24 |
| 4,860,132 | 8/1989 | Lorteije | 360/84 |
| 5,220,472 | 6/1993 | Okamoto et al. | 360/107 |

FOREIGN PATENT DOCUMENTS

| | | |
|---|---|---|
| 61-214271 | 9/1986 | Japan . |
| 393020 | 4/1991 | Japan . |
| 9-306065 | 11/1997 | Japan . |

*Primary Examiner*—William Klimowicz
*Attorney, Agent, or Firm*—Antonelli, Terry, Stout & Kraus, LLP

[57] ABSTRACT

An arrangement is designed to achieve satisfactory tape contact by setting a specific ratio for the width of a drum window and the head length of a double azimuth head. The head length L is defined as the distance from the front end of the preceding head to the back end of the succeeding head. When the drum window width W is defined as the distance of the drum window in the rotary direction, the preceding head and the succeeding head are arranged within the drum window to satisfy the relation $1.15\,L \leq W \leq 1.28\,L$. When the space S1 is defined as the distance from the front end of the preceding head to the front end of the drum window, and the space S2 is defined as the distance from the back end of the succeeding head to the back end of the drum window, the preceding head and the succeeding head are arranged within the drum window to satisfy the relation $0.075\,L \leq S1 \leq 0.14\,L$ and $0.075\,L \leq S2 \leq 0.14\,L$. According to this arrangement, the magnetic tape intrudes preferably into the space between the double azimuth head and the drum window. The magnetic tape envelopes and contacts the head surface, so that the tendency for a spacing to occur between the head and the tape is suppressed. The reproducing output is increased and stabilized in this way.

36 Claims, 17 Drawing Sheets head sliding direction tape running direction drum rotating direction waveform factor = $V_{min}/V_{max} \times 100\%$

| factors | specification |
| --- | --- |
| recording wavelength [μm] | 0.5~0.9 |
| drum diameter [mm] | Φ40 |
| revolutions of rotary drum [rpm] | 3600~4500 |
| tape tension in running direction [μm] | 100~150 (drum entrance) |
| head protrusion [μm] | 20020~20030 (from drum center) |
| head core width | 50~70 |
| magnetic tape material [mm] | metal particle (MP) |
| magnetic tape width [mm] | 8 |
| magnetic tape thickness [μm] | 7.8 / 10 / 13 |

ROTARY DRUM EQUIPMENT AND RECORDING/REPRODUCING EQUIPMENT USING THE SAME

BACKGROUND OF THE INVENTION

The present invention relates to rotary drum equipment of the type that is used with helical scan recording/reproducing equipment and is especially suitable in a double azimuth head and to recording/reproducing equipment using such a head.

In recording/reproducing equipment of the helical scan type, a rotary upper drum is provided with an opening (hereinafter referred to as a "drum window") in the outer periphery thereof at a part opposing a lower stationary drum. A magnetic head is installed into the drum window so that it projects slightly from the upper drum surface. The rotating magnetic head slides on a magnetic tape that is transported over the surface of the drum equipment and records/reproduces a signal to/from the tape.

In view of the high speed sliding movement of the head on the surface of the tape, the magnetic head and the magnetic tape must keep in good contact with each other in order for the magnetic head to provide a good reproducing output. Rotary drum equipment that requires high picture quality and the recording of a large amount of information, such as for a digital VTR, requires a speed-up of the drum rotation, a mounting of multi heads on the drum and short wave-length recording. In such a drum, it is easy for deterioration of the contact between a magnetic head and the magnetic tape to occur, as well as enlargement of the spacing between a head and the tape, thereby causing deterioration of the reproducing output. Especially, in the recording of a short wavelength of less than 1 $\mu$m, the deterioration of the reproducing output is extreme.

In a magnetic head that consists of a single head chip with a single gap azimuth (hereinafter referred to as a "single azimuth head"), a groove is provided on the surface of an upper drum, as shown in Japanese patent Laid-open Publication 61-214271. The air adjacent the drum during the rotation of the upper drum runs away through this groove, and so the flying height of the magnetic tape can be reduced. As a result, good contact is achieved between a magnetic head and the magnetic tape.

In a magnetic head that consists of two head chips that have two different gap azimuths (hereinafter referred to as a "double azimuth head"), the spacing of the magnetic heads in the drum window was set according to the following condition, as described in Japanese patent Laid-open Publication 3-93020. The space between the preceding head and the drum window was made smaller than the space between a succeeding head and the drum window in the direction of rotation. This causes the contact and the wear to become even at the preceding head and the succeeding head.

As is disclosed in the above-referenced publication concerning the single azimuth head, a groove carved in an upper drum acts to set the air between a magnetic tape and an upper drum free and to provide good contact between the tape and the head.

SUMMARY OF THE INVENTION

However, applicants have determined from studies that merely providing a groove that sets the air free in a double azimuth head fails to produce a sufficient contact between the magnetic head and the magnetic tape. The difference in this effect between the rotary drum equipment on which a single azimuth head is mounted and the rotary drum equipment on which a double azimuth head is mounted will be described below.

FIG. 4 shows how the magnetic tape 7 in the head neighborhood is deformed in rotary drum equipment in which a single azimuth head 10 is installed in an upper drum 3 with a screw 12 through a base 11. When the magnetic head 10 slides on the tape 7 at high speed, the magnetic tape 7 intrudes into the space between the drum window 4 and the preceding side of the head. The magnetic tape 7 also intrudes into the space between the drum window 4 and succeeding side of the head. The quantity of tape intrusion into the succeeding side is smaller than that at the preceding side. Therefore, a small spacing occurs in the magnetic tape 7 on the succeeding side of the magnetic head 10. However, the spacing has little effect on the head gap 13, and so the reproducing output is not deteriorated.

On the other hand, FIG. 2 illustrates a magnetic tape running system for a videotape recorder on which a double azimuth head is mounted. The magnetic tape 7 is driven in the direction of the arrow by a tape drive unit 8. Magnetic heads 1,2 scan the magnetic tape 7 following the contour of the upper drum 3. The preceding head 1 and the succeeding head 2 record or reproduce a signal simultaneously. To realize a simultaneous recording/reproducing, the preceding head 1 and succeeding head 2 are installed in the upper drum 3 in such a way as to have a specified step difference in the drum axial direction.

FIG. 3 illustrates rotary drum equipment on which a double azimuth head is mounted. Drum window 4 is formed in the lower end of the upper drum 3. Magnetic heads 1,2 are installed directly or through a head base (not illustrated) in the drum window 4 with a slight protrusion toward the outside from the outer peripheral face of the upper drum 3. Magnetic tape 7 is wound on the drum helically along a lead 9 formed in the lower drum 5, as shown by a chain line, and is driven by the tape drive unit 8 shown in FIG. 2. Following the rotation of the upper drum 3, the magnetic heads 1,2 scan the magnetic tape 7 helically from the lower side of a magnetic tape to the upper side thereof, and thereby record/reproduce a signal.

FIG. 5 illustrates rotary drum equipment with the magnetic heads 1,2 installed in the upper drum 3 with a screw 12 through a base 11. When the magnetic head 1,2 slides on the tape 7 at high speed, magnetic tape 7 intrudes into the space between the drum window 4 and the preceding head in the same way as the single azimuth head. However, in the double azimuth head, the tape formation produces a spacing between the succeeding head 2 and the magnetic tape 7 in the neighborhood of the head gap 13 of the succeeding head 2. Therefore, the reproducing output of the succeeding head 2 is deteriorated.

In addition, the tape contact area of the magnetic tape 7 with the rotating upper drum 3 decreases gradually at the tape exit side from the drum, as shown in FIG. 3. Therefore, the degree at which the magnetic tape 7 floats on the upper drum surface becomes small, and so the contact force of the magnetic heads 1,2 with the magnetic tape 7 becomes large. In addition, the magnetic heads 1,2 touch the upper edge of the magnetic tape 7 in such a way as to cause the magnetic tape 7 to be deformed by the protrusion of the magnetic heads 1,2, as is illustrated in FIG. 6. Therefore, the tape cannot uniformly contact the head slide face, and this causes a spacing in the neighborhood of the head gap. Further, in the double azimuth head, the magnetic heads 1,2 have a step difference in the drum axial direction. In case the magnetic heads 1,2 slide on the upper edge of magnetic tape 7, the magnetic tape 7 deforms so as to draw away from magnetic heads 1,2. Therefore, the envelopment of the tape in the drum axial direction runs short, and as shown in FIG. 7, the reproducing output of the succeeding head 2 is deteriorated on the drum exit side. This phenomenon is especially noticeable when the magnetic tape is thick and the tape stiffness is high.

When a magnetic tape with high stiffness runs for a long time, the shape of the preceding head 1 becomes flat at the head gap 13 because of the high contact pressure. This phenomenon will be explained with reference to FIG. 8. The curvature of the slide face of a magnetic head is a measure of the radius of the primary interference fringe that is produced during observation under an interference microscope, and the curvatures Rx and Ry in directions that are orthogonal to a head slide direction can be calculated. The head shape becomes pointed as these curvatures Rx and Ry are made small. As is shown in FIG. 8, in the double azimuth head, curvature Ry greatly changes with the tape running time. Ry enlarges, and as it does, the head shape becomes flat. This is because, as was explained previously, the magnetic tape 7 is deformed with its intrusion into the space between preceding head 1 and the drum window 4 following the drum high speed rotation, and this causes the contact pressure of the preceding head 1 to become high.

FIG. 10 shows a deformation of the magnetic tape 7 in the center of the drum winding. The width in the top and bottom directions appears to be larger in the double azimuth head in comparison with the single azimuth head, because the preceding head 1 and the succeeding head 2 are installed with a step difference in the double azimuth head. Therefore, as shown in FIG. 10, the envelopment of the magnetic tape 7 runs short at the magnetic head in the top and bottom directions. In addition, as shown in FIG. 5, the tape intrudes into the space between the preceding head 1 and the drum window 4. Because the width of the double azimuth head in the top and bottom directions appears to be large, this formation widely exists in the top and bottom directions. This formation of the magnetic tape 7 increases the stiffness of the magnetic tape 7 in the top to bottom direction, so that, the envelopment of the magnetic tape 7 runs short at the magnetic heads 1 and 2 in the double azimuth head in the top and bottom directions in comparison with a single azimuth head. Therefore, when a thick tape having a high stiffness runs, the shape of the preceding head 1 becomes flat.

When a thin tape having a low stiffness runs on a flattened head, the tape envelops the head excessively dependent on the tape stiffness, and the formation of the magnetic tape 7 does not fit the shape of the magnetic head. Therefore, although the magnetic tape 7 strongly contacts the head core edge, a spacing is produced in the neighborhood of the gap 13 of the preceding head 1. FIG. 9 shows the envelope of the reproducing output in this state. Especially, the reproducing output deteriorates in the area from the drum winding center to the exit side. Comparing the double azimuth head to the single azimuth head, the reproducing output tends to deteriorate during high speed rotation of the drum due to this phenomenon.

In the prior device, a measure was taken in which the space between the preceding head 1 and the drum window 4 is made smaller than the space between the succeeding head 2 and drum window 4 in order to solve the above-mentioned problem in the double azimuth head. The tape contact and the wear rate at the preceding head 1 and the succeeding head 2 are made more uniform by this technique. However, the contact by the magnetic tape with the drum is influenced by the ratio of the magnetic head shape and the drum window shape. A sufficient effect is not achieved merely by adjusting the space between the magnetic head and the drum window.

Accordingly, one object of a present invention is to provide a good contact between a magnetic head and a magnetic tape at both a preceding head and a succeeding head by optimizing the ratio of the magnetic head shape and the drum window shape, in rotary drum equipment and recording/reproducing equipment mounting a double azimuth head to record a short wave-length signal.

Another object of the present invention is to reduce the deterioration of tape contact when changing to a tape with a different stiffness after a long running time.

Especially, it is an object to improve the reproducing output in rotary drum equipment and recording/reproducing equipment to record a short wavelength signal of less than 1 $\mu$m.

To achieve the above objects, rotary drum equipment and recording/reproducing equipment according to the present invention are characterized as follows.

When the head length L is defined as the distance from the front end of a first head to the back end of a second head, and the drum window width W is defined as the distance of said drum window in the rotary direction, said first head and said second head are arranged within said drum window to satisfy the relation $1.15 \text{ L} \leq \text{W} \leq 1.28 \text{ L}$, or the relation $1.15 \text{ L} \leq \text{W} \leq 1.20 \text{ L}$, or more suitably the relation $1.16 \text{ L} \leq \text{W} \leq 1.20 \text{ L}$.

When the head length L is defined as the distance from the front end of a first head to the back end of a second head, and the space S1 is defined as the distance from the front end of said first head to the front end of said drum window, and the space S2 is defined as the distance from the back end of said second head to the back end of said drum window, said first head and said second head are arranged within said drum window to satisfy the relations $0.075 \text{ L} \leq \text{S1} \leq 0.14 \text{ L}$ and $0.075 \text{ L} \leq \text{S2} \leq 0.14 \text{ L}$, or the relations $0.075 \text{ L} \leq \text{S1} \leq 0.1 \text{ L}$ and $0.075 \text{ L} \leq \text{S2} \leq 0.1 \text{ L}$.

Recording/reproducing equipment of the helical scan type comprises a mechanical chassis, tape drive means for driving a magnetic tape, tape tension control means for giving said magnetic tape a specified tension, and rotary drum equipment for recording/reproducing a signal to/from said magnetic tape, wherein said rotary drum equipment is characterized in that a first head and a second head are arranged within a drum window to satisfy the above relations.

According to the above structure, the relation of a magnetic head shape and a drum window shape can be optimized and the tape contact between a magnetic head and a magnetic tape can be good at both a preceding head and a succeeding head. And, deterioration of the tape contact can be reduced when changing to a tape with a different stiffness after a long running time.

BRIEF DESCRIPTION OF THE DRAWINGS

The present invention will become more apparent from the following detailed description, when taken in conjunction with the accompanying drawings, in which.

DETAILED DESCRIPTION OF THE PREFERRED EMBODIMENTS

Figure 1:
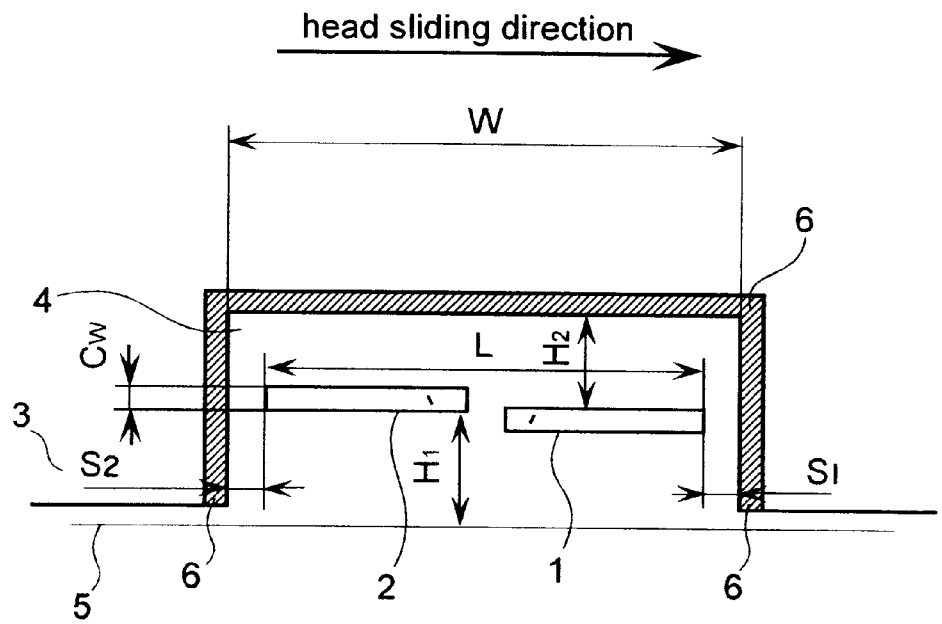
FIG. 1 is a diagram of a magnetic head (a double azimuth head) installed in the drum window that is concerned with the rotary drum equipment according to the present invention.
Figure 2:
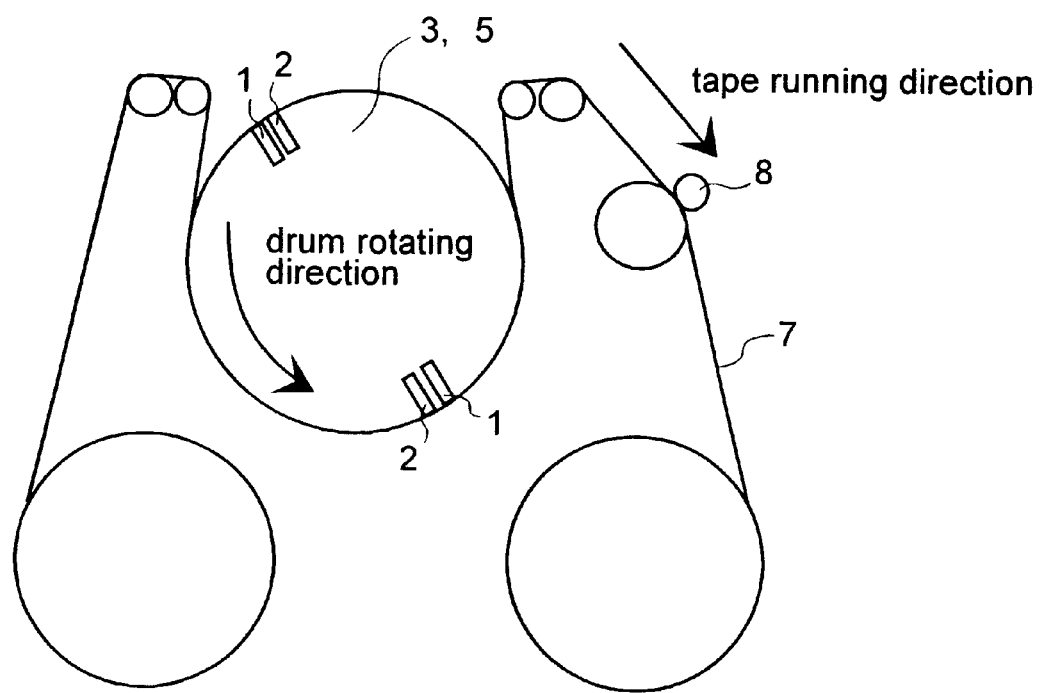
FIG. 2 is a diagram of a magnetic tape running system of a VTR.
Figure 3:
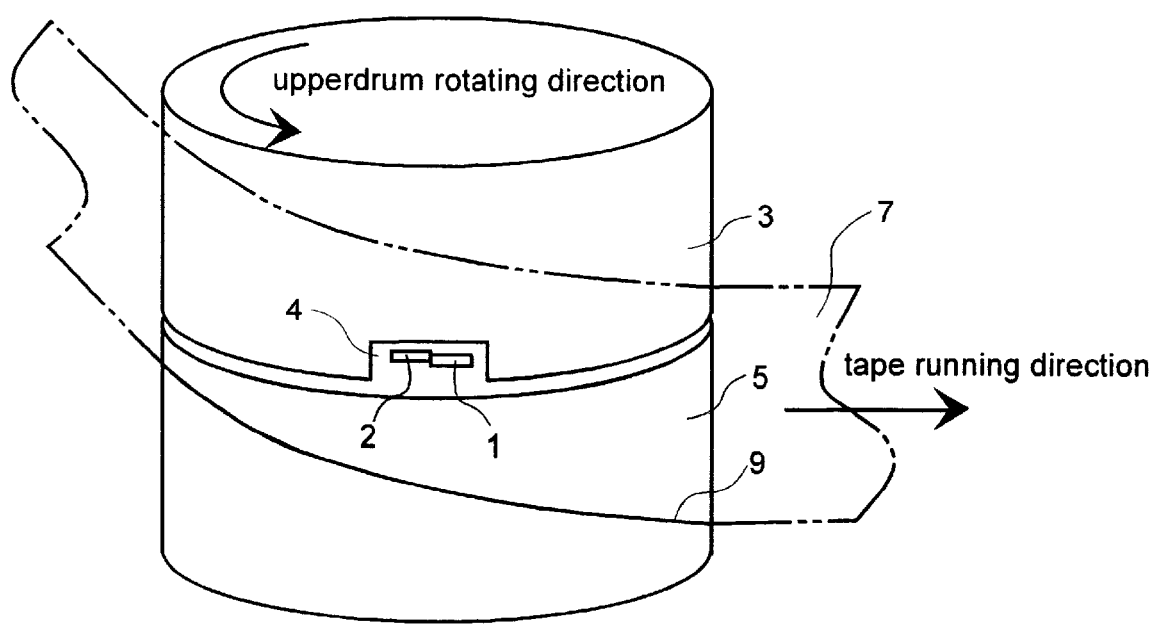
FIG. 3 is a diagram of rotary drum equipment around which a magnetic tape is wound.
Figure 4:
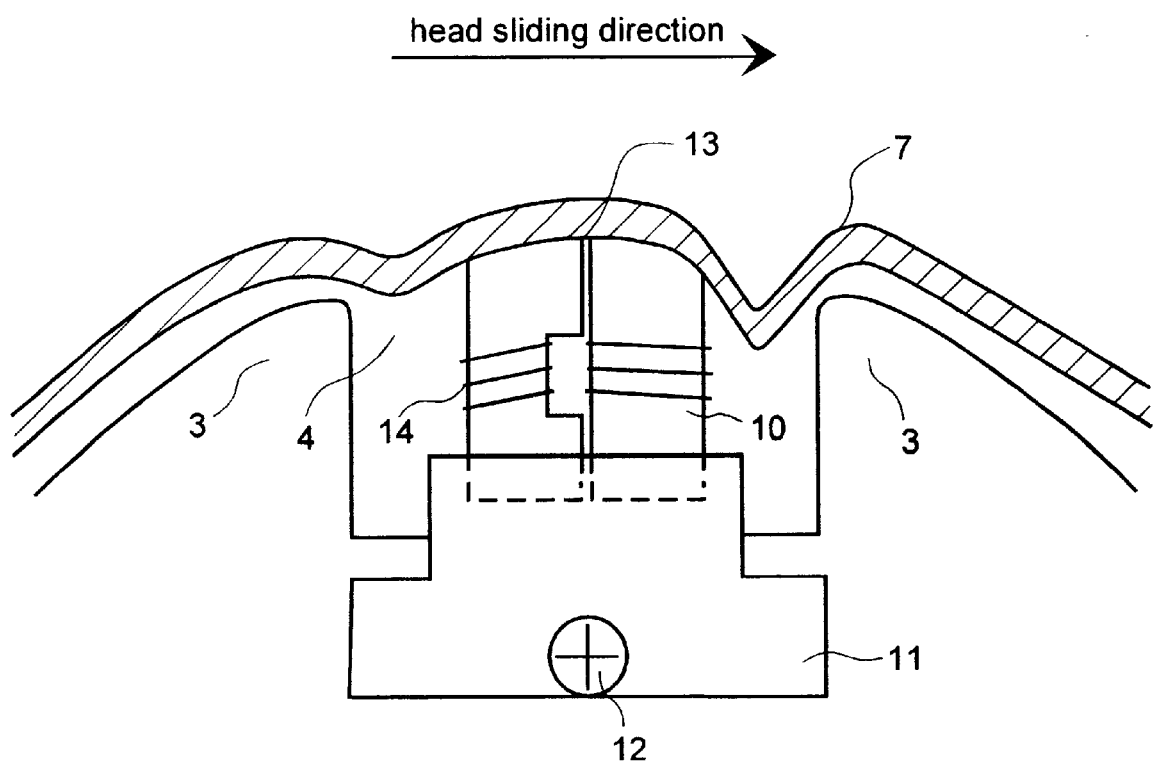
FIG. 4 is a diagram which shows the formation of a magnetic tape in rotary drum equipment on which a single azimuth head is mounted.
Figure 5:
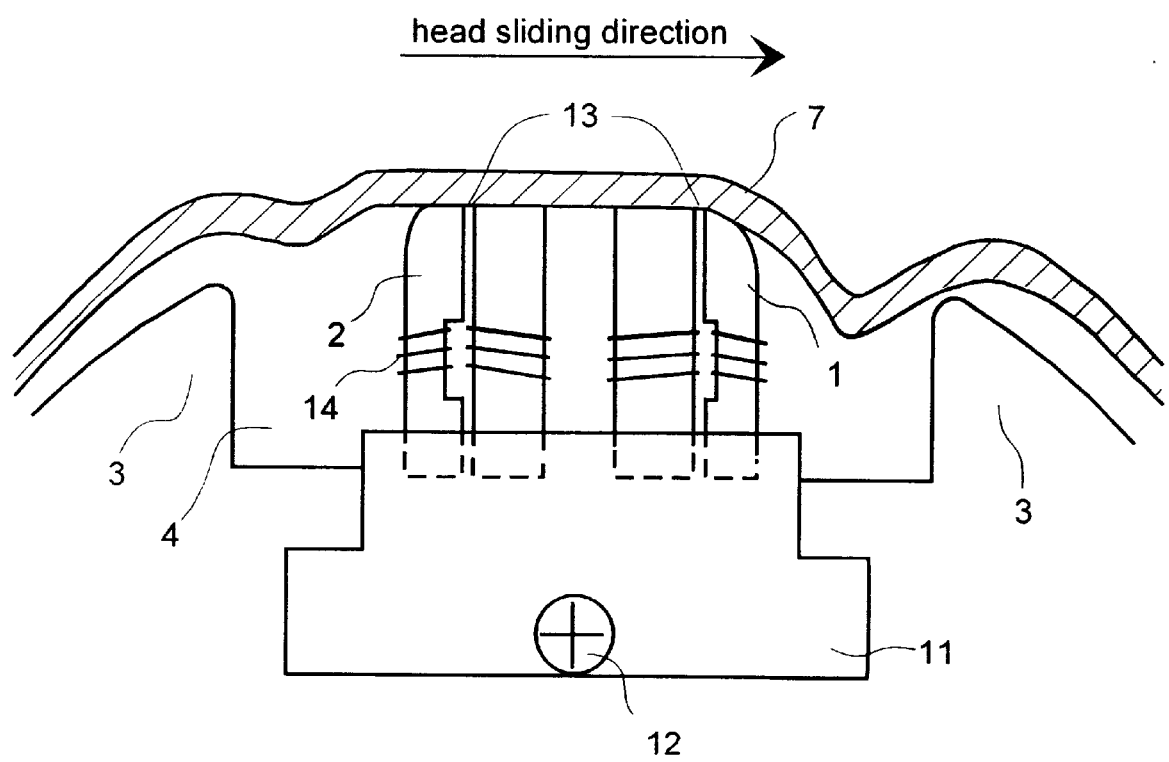
FIG. 5 is a diagram which shows the formation of a magnetic tape in conventional rotary drum equipment on which a double azimuth head is mounted.
Figure 6:
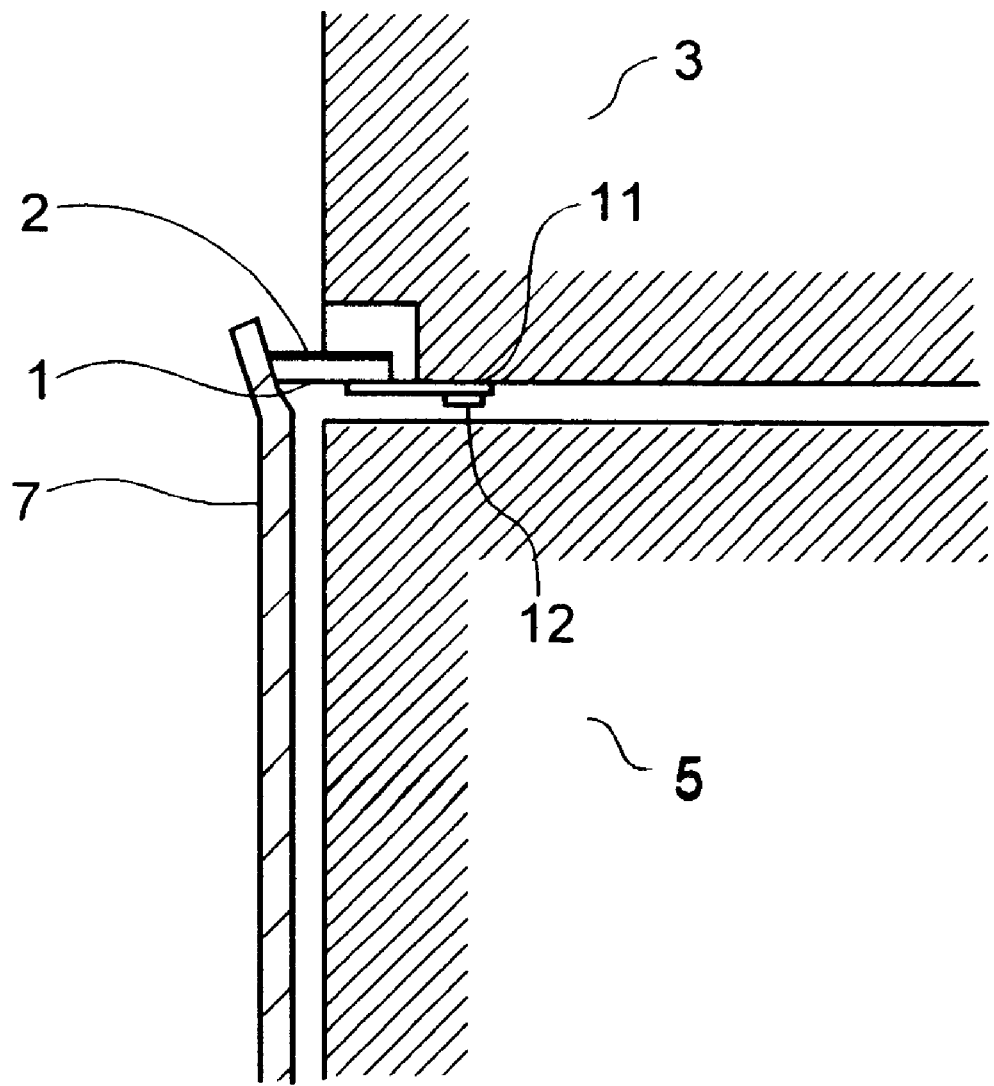
FIG. 6 is a diagram which shows the formation of a magnetic tape at the drum exit side in conventional rotary drum equipment.
Figure 7:
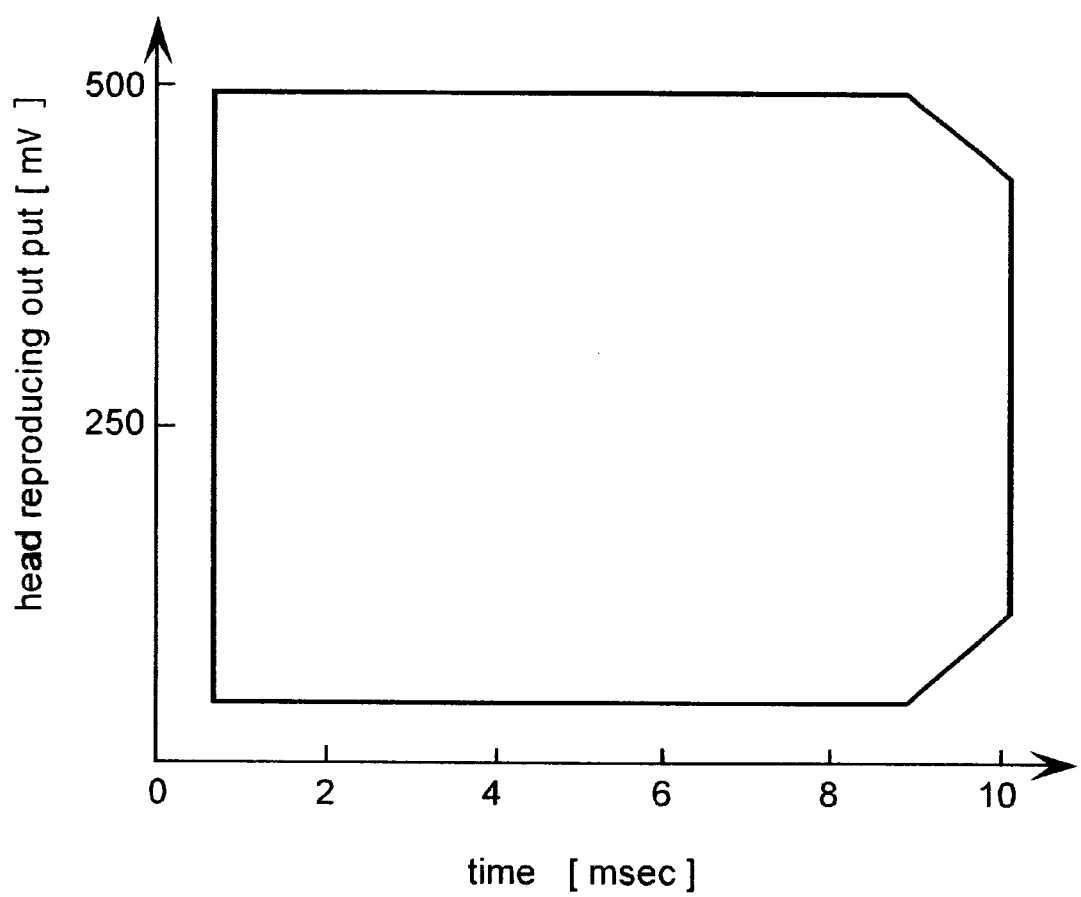
FIG. 7 is a diagram which shows an envelope of the reproducing output of a succeeding head in conventional rotary drum equipment.
Figure 8:
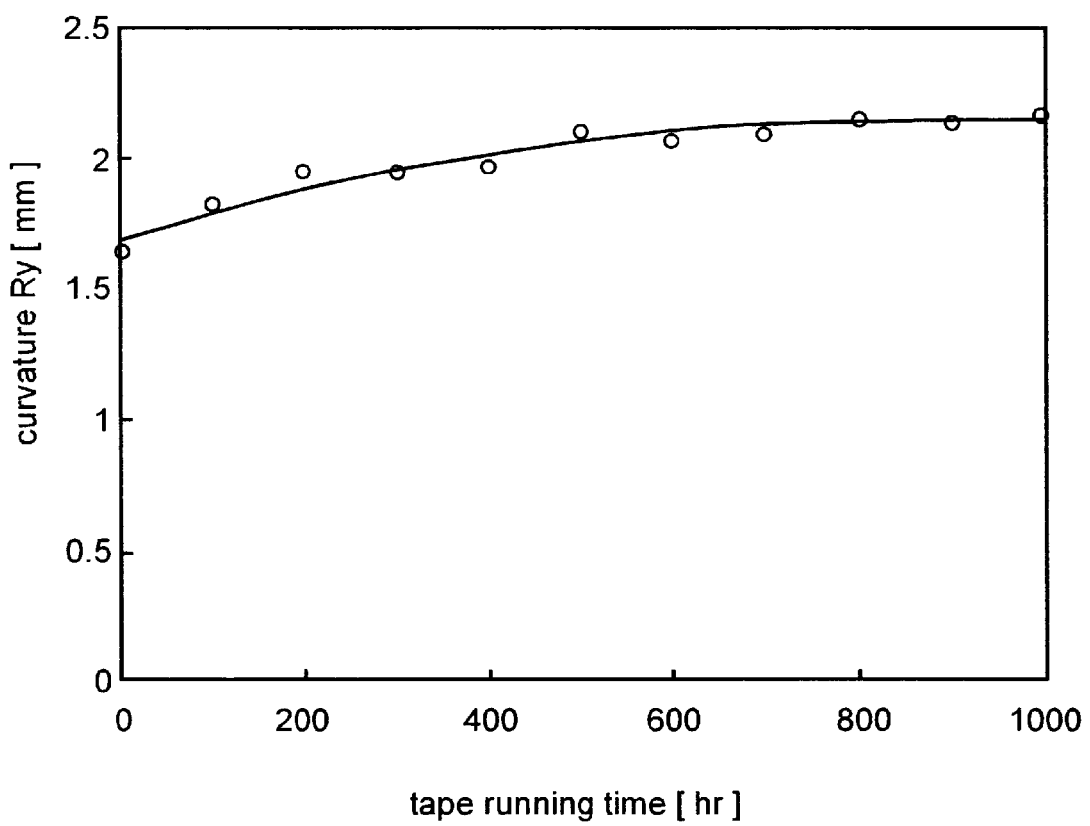
FIG. 8 is a graph which shows a change of shape of a preceding head vs. a magnetic tape running time in conventional rotary drum equipment.
Figure 9:
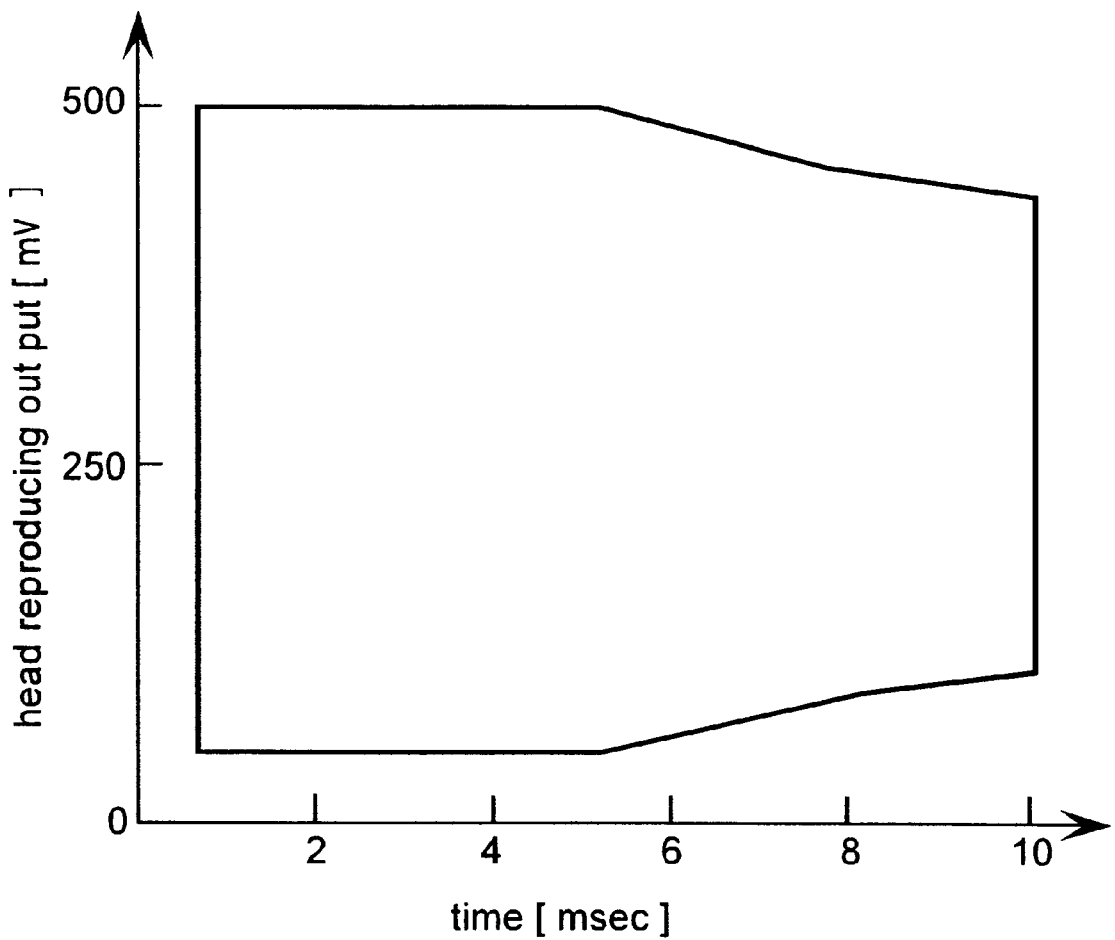
FIG. 9 is a diagram which shows an envelope of the reproducing output of a preceding head in conventional rotary drum equipment.
Figure 10:
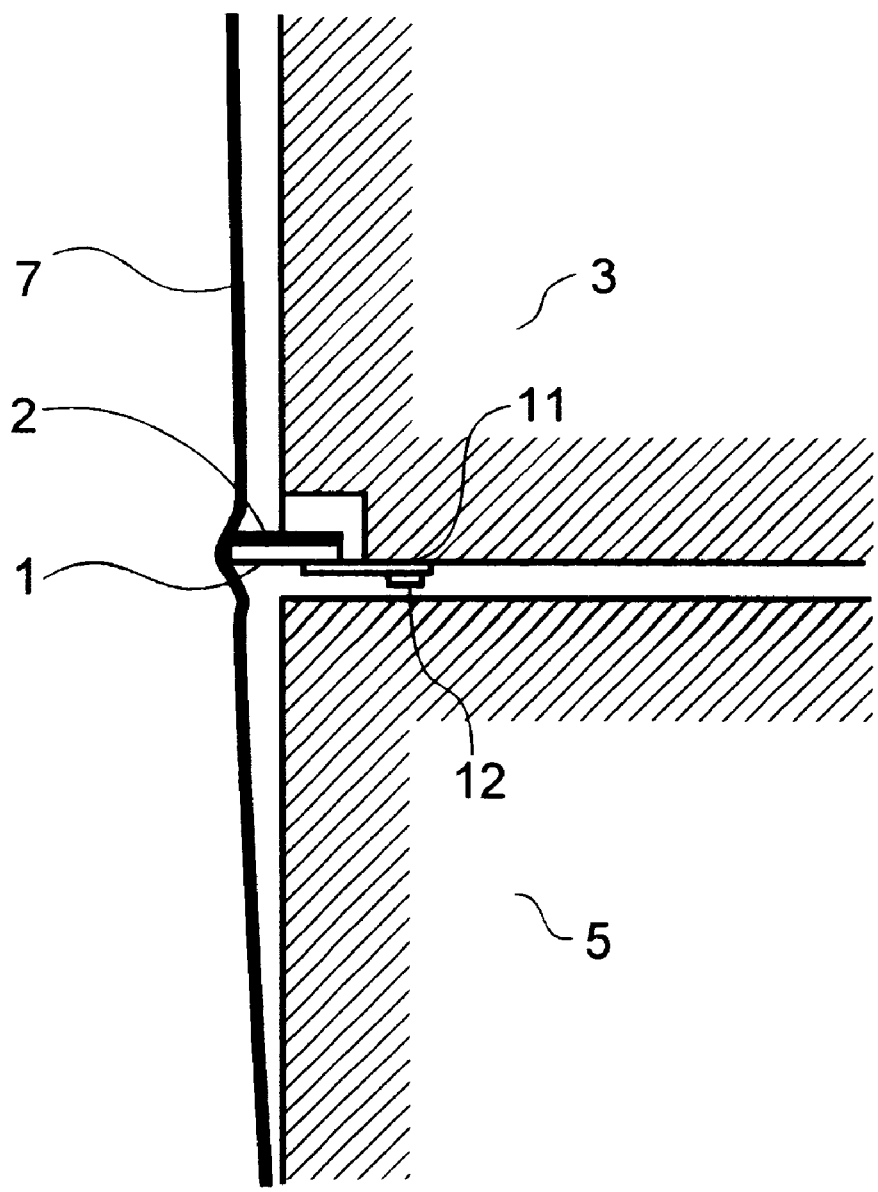
FIG. 10 is a diagram which shows the formation of a magnetic tape at the drum winding center in conventional rotary drum equipment.

A preferred embodiment of the present invention will be explained with reference to the drawing.

FIG. 1 shows rotary drum equipment according to the present invention that employs a double azimuth head in the drum window of an upper rotary drum. It includes a preceding head 1, a succeeding head 2, an upper drum 3, the drum window 4, a lower drum 5, and the unit 6, that represents the R manufacture and buff finishing manufacture of drum window 4.

Figure 13:
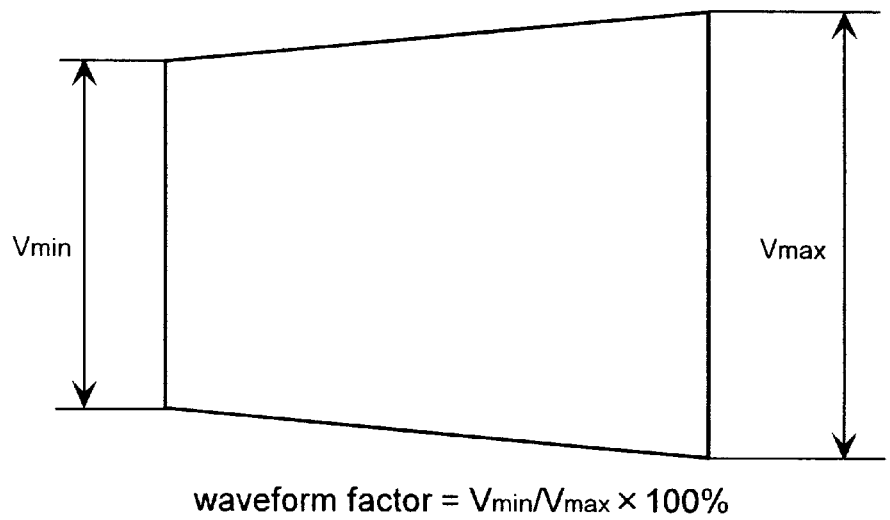
FIG. 13 is a diagram which shows an envelope of the reproducing output and a waveform factor.

A first feature of the present invention will be explained. As shown in FIG. 1, the distance from the front end of the first head to the back end of the second head is indicated as the head length L, and the distance along the rotary direction of the drum window is indicated as the drum window width W. FIG. 13 shows the envelope of the output signal when a magnetic head slides from the lower side to the upper side of the magnetic tape. The waveform factor is defined as (Vmin/Vmax)×100%, when the maximum value of reproducing output is Vmax, and a minimum value is Vmin.

Figure 14:
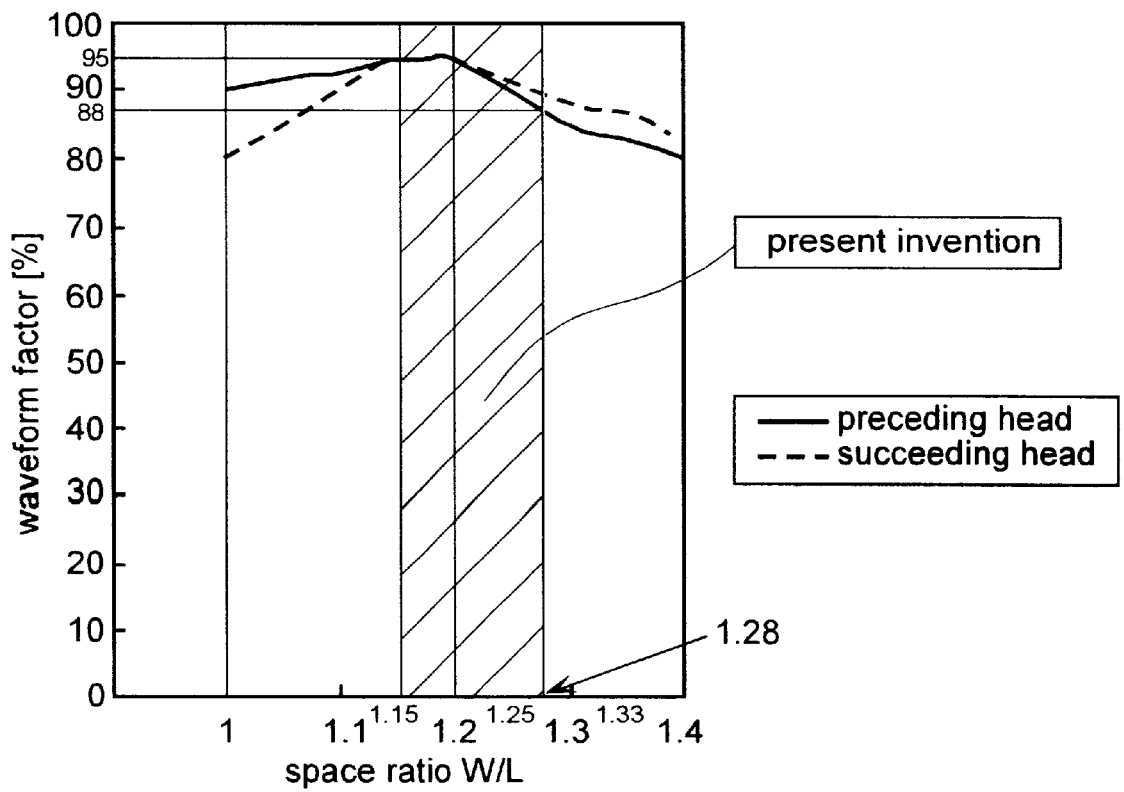
FIG. 14 is a graph which shows the relationship between the space ratio (W/L) and the waveform factor.

FIG. 14 illustrates the relationship between the waveform factor and the space ratio (W/L) in which W is the drum window width and L is a magnetic head width. It is not uncommon for a thin tape with low stiffness to be run after a thick tape with a high stiffness has been run for a long time. Under such circumstances, when the space ratio (W/L) is large, the waveform factor deteriorates to 80%. This is because the slide face of the preceding head 1 has changed so as to be flat after being subjected to thick tape running for a long time, and a spacing occurs between the gap of the preceding head 1 and the thin tape 7. But, when the space ratio (W/L) is set to be small, the space from the front end of the preceding head to the front end of the drum window becomes small, and so the tape formation is suppressed in this part. Then, because the tape moves along a seesaw path around the preceding head 1, the spacing between the succeeding head 2 and the tape is suppressed, and so a good reproducing output is achieved. However, when the space ratio (W/L) is less than 1.15, the tape 7 cannot intrude into the space, so that the tape cannot envelope the head 1,2 suitably. Then, a spacing occurs at the succeeding head and the reproducing output deteriorates.

Figure 15:
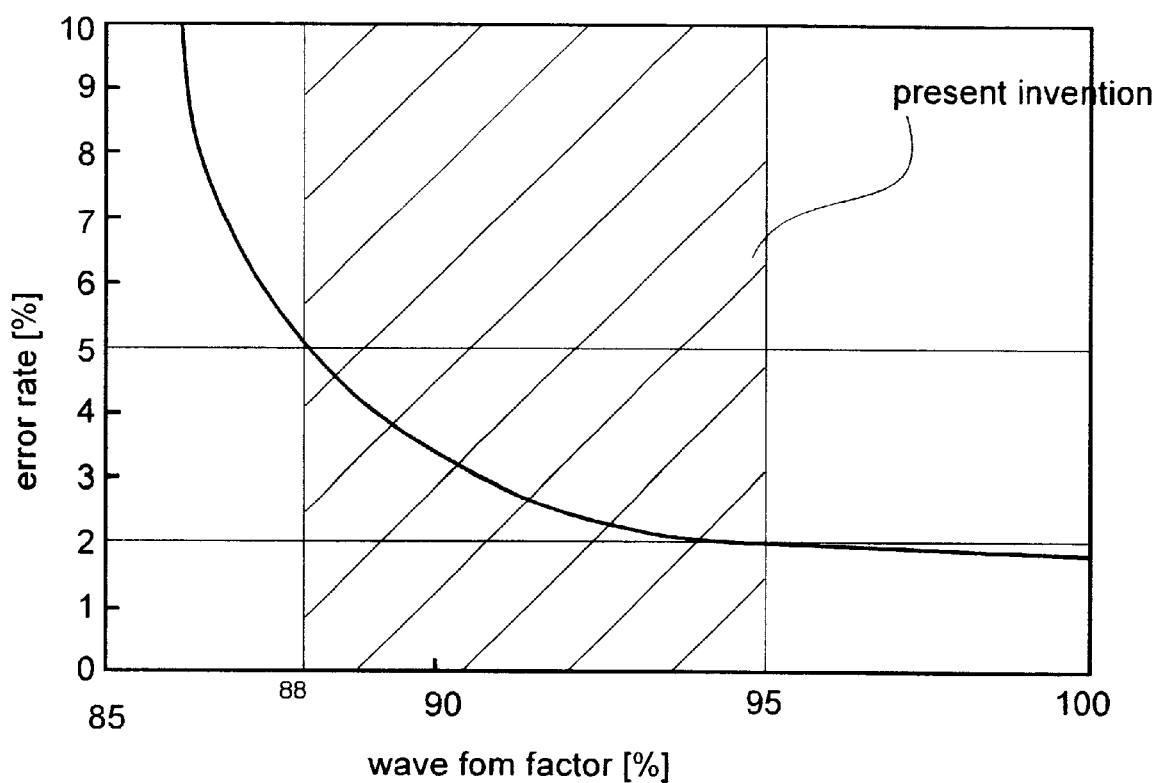
FIG. 15 is a graph which shows the relationship between a waveform factor and an error rate.

FIG. 15 illustrates the relationship between the waveform factor and the error rate. When the waveform factor is 88% or more, the error rate becomes 5% or less. When the waveform factor is below 88%, the error rate suddenly increases. In this region, error correction is difficult, so it cannot be employed in this region in actual use. Therefore, the space ratio should be set as W≦1.28 L, as shown in the slanting line area of FIG. 14. In this way, the tape intrusion at the drum window 4 is suppressed, so that the wear on the head is decreased, and the waveform factor of the preceding head 1 and the succeeding head 2 becomes 88% or more.

Because the contact pressure of the slide face of the preceding head is suppressed, the shape of the gap in the neighborhood of the preceding head 1 does not become flat, even if a thick tape with high stiffness has run for a long time, so that it is made even. Thus, the reproducing output of a thin tape does not deteriorate at the drum winding center.

Figure 12:
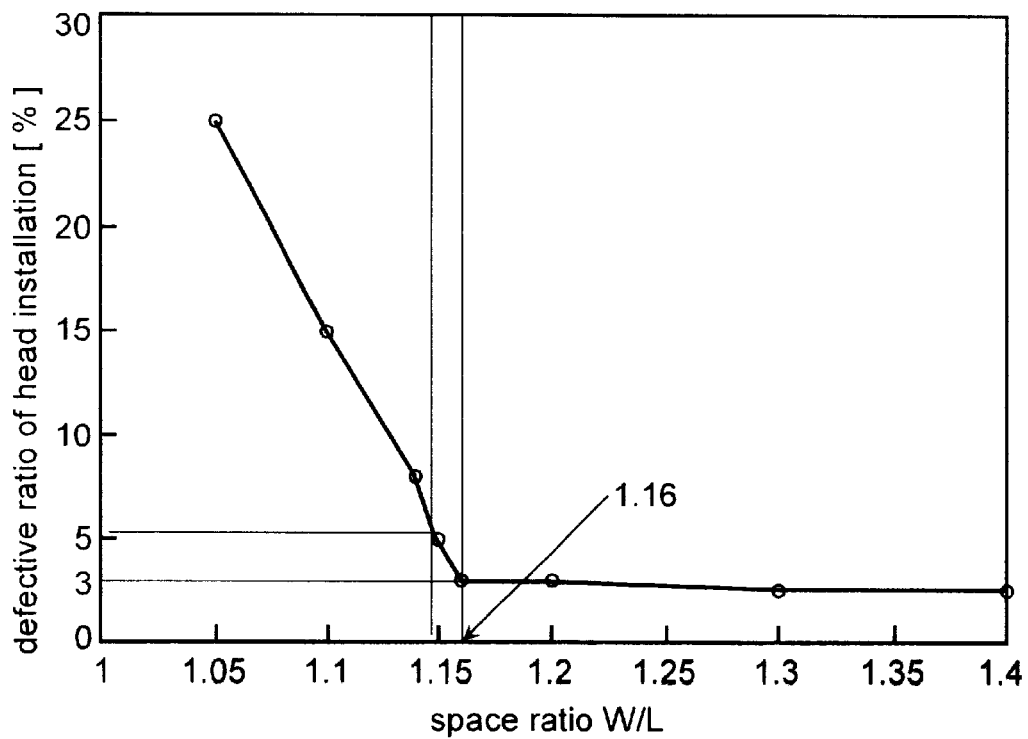
FIG. 12 is a graph which shows the relationship between the space ratio (W/L) and the defective rate of head installation.

On the other hand, if this space ratio is too small, the magnetic heads 1,2 are likely to touch the drum window when being installed in the upper drum 3. FIG. 12 illustrates the relationship between the space ratio and the defective ratio of a head installation. When the space ratio (W/L) is 1, the magnetic heads 1 and 2 touch the drum window 4. From FIG. 12, it is seen that, if the space ratio is set to 1.15 L≦W, the defective ratio of the head installation becomes 5% or less, and so no problem occurs in production.

Figure 17:
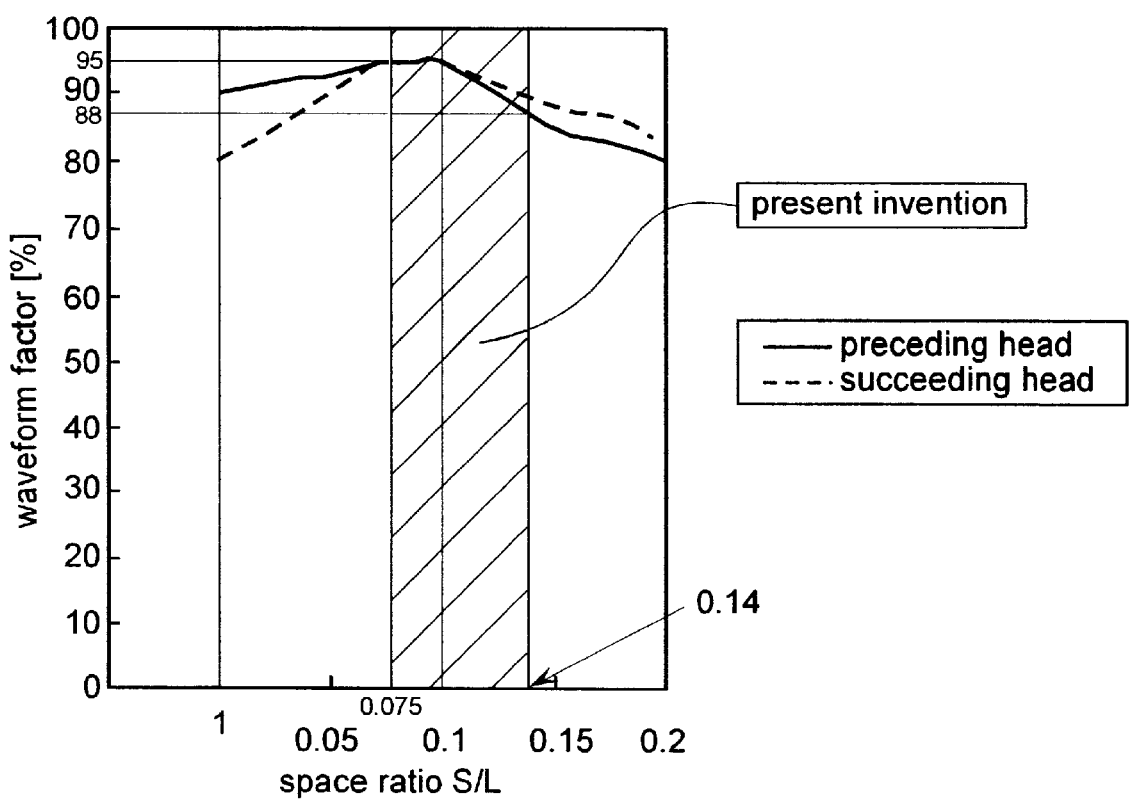
FIG. 17 is a graph which shows the relationship between the space ratio (S/L) and the waveform factor.

For the above reason, the space ratio of W and L is set in a range of 1.15 L≦W≦1.28 L. As a result, a good reproducing output is achieved, and the above structure has no problem from the viewpoint of production. And, when the space ratio is set in the range of 1.15 L≦W≦1.20 L, the waveform factor becomes 95% or more, and the error rate becomes 2% or less, and a better output is obtained. Thus, this system can have a margin against a change in the environment. In addition, when the space ratio is set in the range of 1.16 L≦W≦1.20 L, the defective rate of the head installation becomes 3% or less, and the system is optimized from the point of view of both the reproducing output and the production of the head assembly. Now, a second feature of the present invention will be explained. As shown in FIG. 1, the distance from the front end of said preceding head 1 to the front end of the drum window 4 is S1, and the distance from the back end of the succeeding head 2 to the back end of the drum window 4 is S2. The space ratio (S1/L),(S2/L) with said head slide width L will be considered. FIG. 17 illustrates the relationship between the space ratio (S/L) and a waveform factor when S1 and S2 are made equal to a value S. When the ratio is set in the range of S≦0.14 L, a good reproducing output which has a waveform factor of 88% or more can be obtained.

Figure 18:
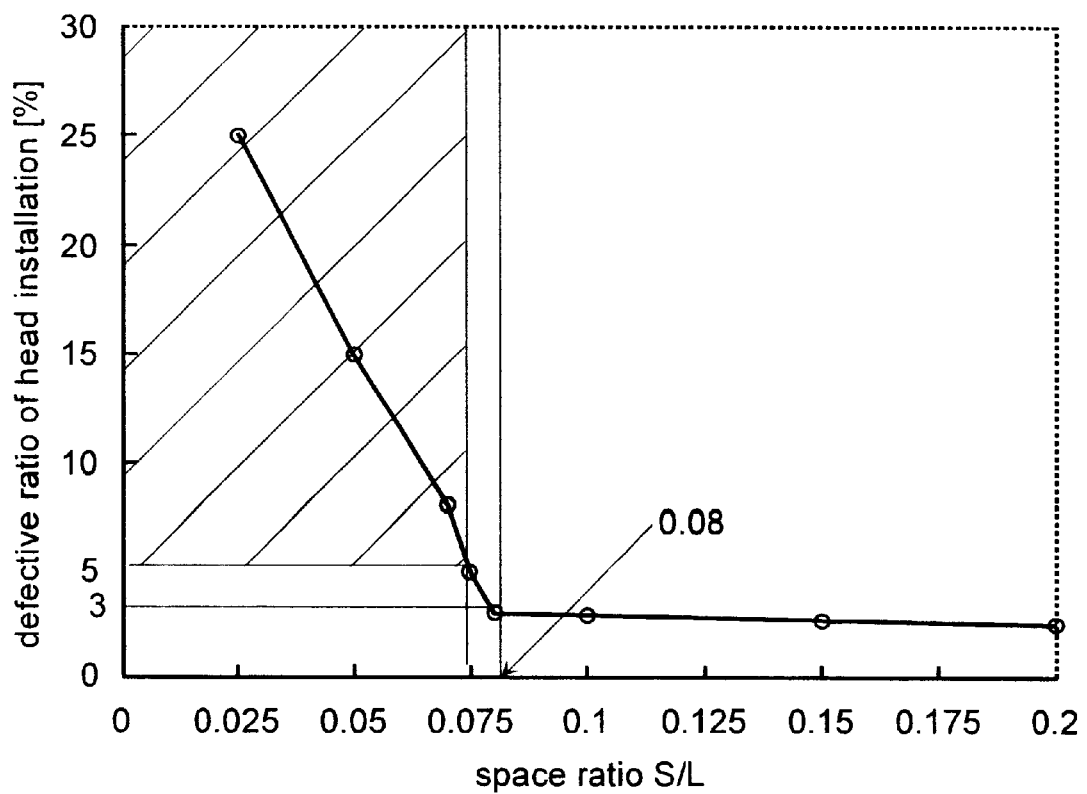
FIG. 18 is a graph which shows the relationship between the space ratio (S/L) and the defective rate of head installation.

As described before, if this space ratio is too small, the magnetic heads 1,2 are likely to touch the drum window when being installed in the upper drum 3. FIG. 18 illustrates the relationship between the space ratio (S/L) and a defective ratio of head installation. When the space ratio is 1, the magnetic heads 1 and 2 touch the drum window 4. From FIG. 18, it can be seen that if the space ratio is set to 0.075 L≦S, a defective ratio of head installation becomes 5% or less, and so no problem occurs in production.

For the above reason, the space ratio of S and L is set in a range of 0.075 L≦S≦0.14 L. As a result, a good reproducing output is achieved, and the above structure is not a problem from the viewpoint of production of the head assembly. And, when the space ratio is set in the range of 0.075 L≦S≦0.1 L, the waveform factor becomes 95% or more, and a better output is obtained. In addition, when the space ratio is set in the range of 0.08 L≦S1≦0.1 L, the defective rate of head installation becomes 3% or less, and the system is optimized from the point of view of both the reproducing output and the production of the head assembly.

Figure 11:
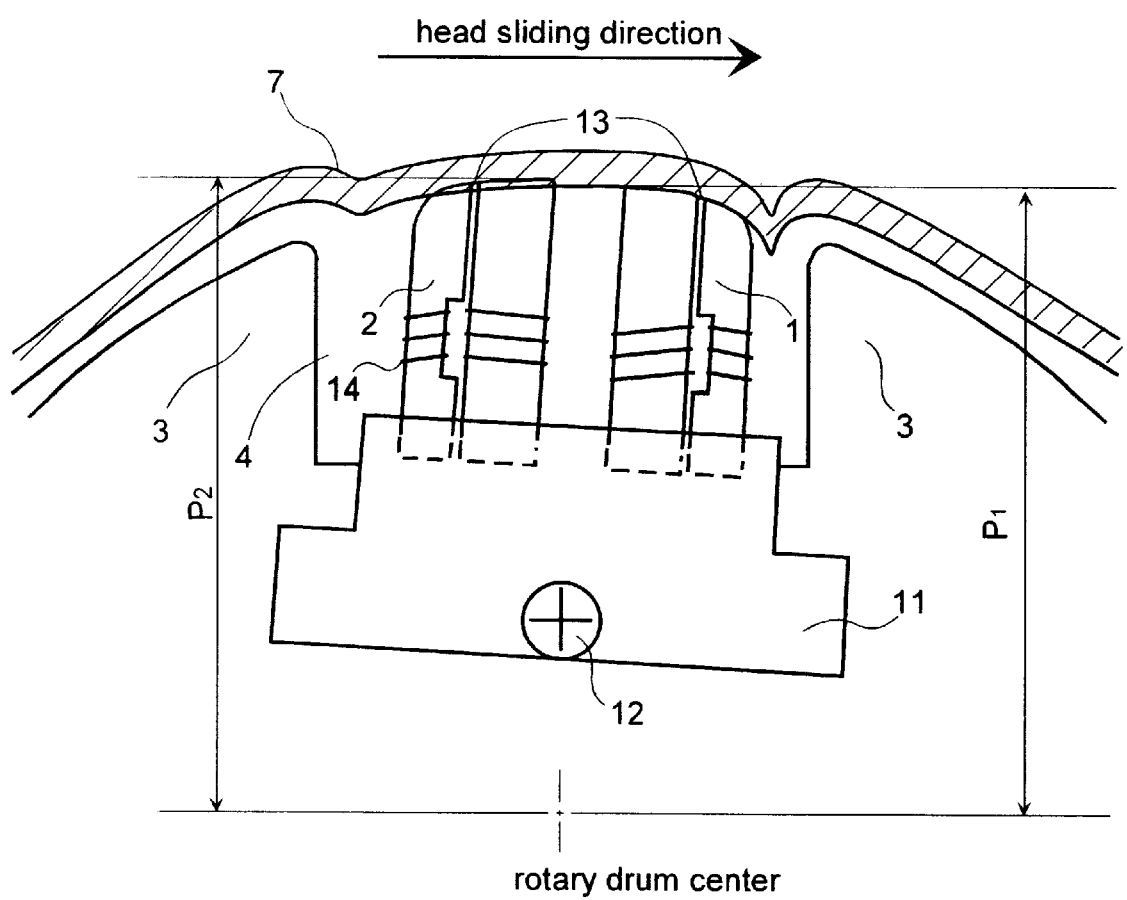
FIG. 11 is a diagram which shows a preferred embodiment of the rotary drum equipment according to the present invention, and, more particularly, the formation of a magnetic tape in the embodiment.

A third feature of the present invention will be explained. As shown in FIG. 11, the protrusion P1 is defined as the distance from the rotary center of the rotary drum to the tape confronting surface of the preceding head 1, and the protrusion P2 is defined as the distance from the rotary center to the tape confronting surface of the succeeding head 2. Although the distances P1 and P2 were set to be equal conventionally, the tape protrusion at the succeeding head 2 is larger than that at the preceding head 1 in accordance with the present invention, namely P1≦P2. This construction results in a good reproducing output. Because the magnetic tape 7 intrudes into the space between the drum window 4 and the preceding head, it is apt to generate a greater spacing at the succeeding head 2 than at the preceding head 1. By setting the protrusion of the succeeding head 2 to be larger than that of the preceding head 1, the spacing of the heads with the magnetic tape 7 decreases.

Figures 19, 20:
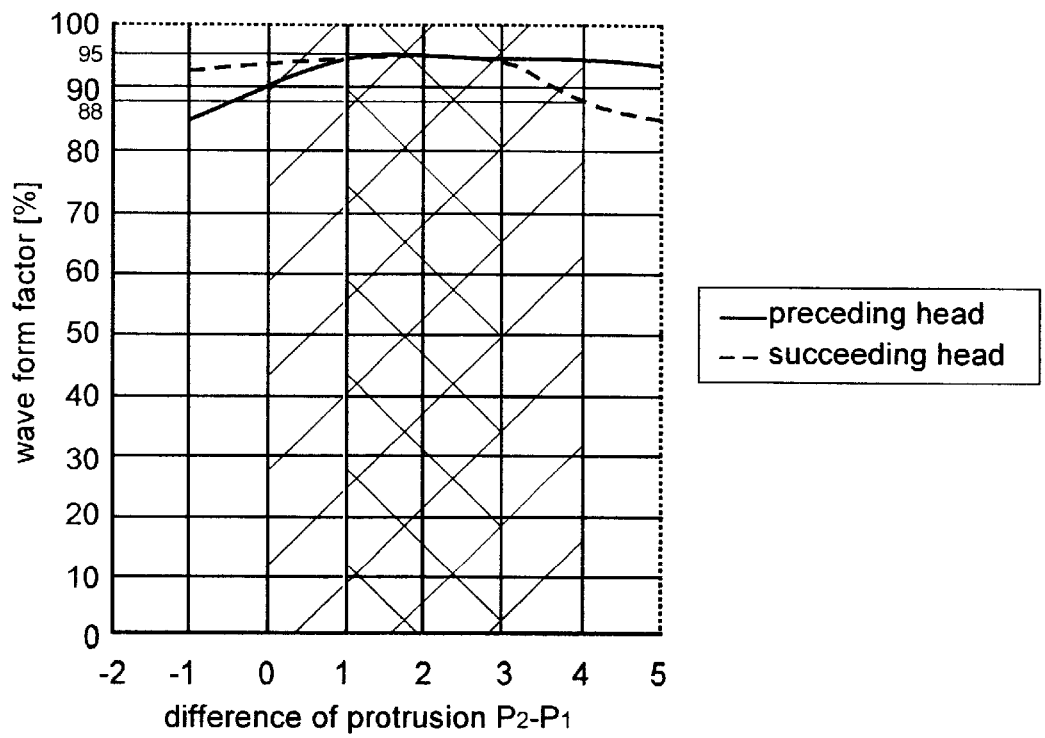
FIG. 19 is a graph which shows the relationship between the difference of protrusion (P2–P1) and the waveform factor.
FIG. 20 is a table of specifications of the embodiment of the rotary drum equipment and the recording/reproducing equipment according to the present invention.

As shown in FIG. 19, when the difference in protrusion is set in the range of 0 μm≦(P2−P1)≦4 μm, a good reproducing output which has a waveform factor of 88% or more can be obtained. When the difference in protrusion is more than 4 μm, the contact at the gap 13 of the succeeding head 2 is deteriorated. This is because the back edge of the succeeding head touches the tape, and the back edge pushes the tape up. Therefore, the difference in protrusion should be 4 μm or less. When the difference is set to 1 μm<(P2−P1)≦3 μm, an even higher reproducing output is obtained, where the waveform factor becomes 85% or more.

Figure 16:
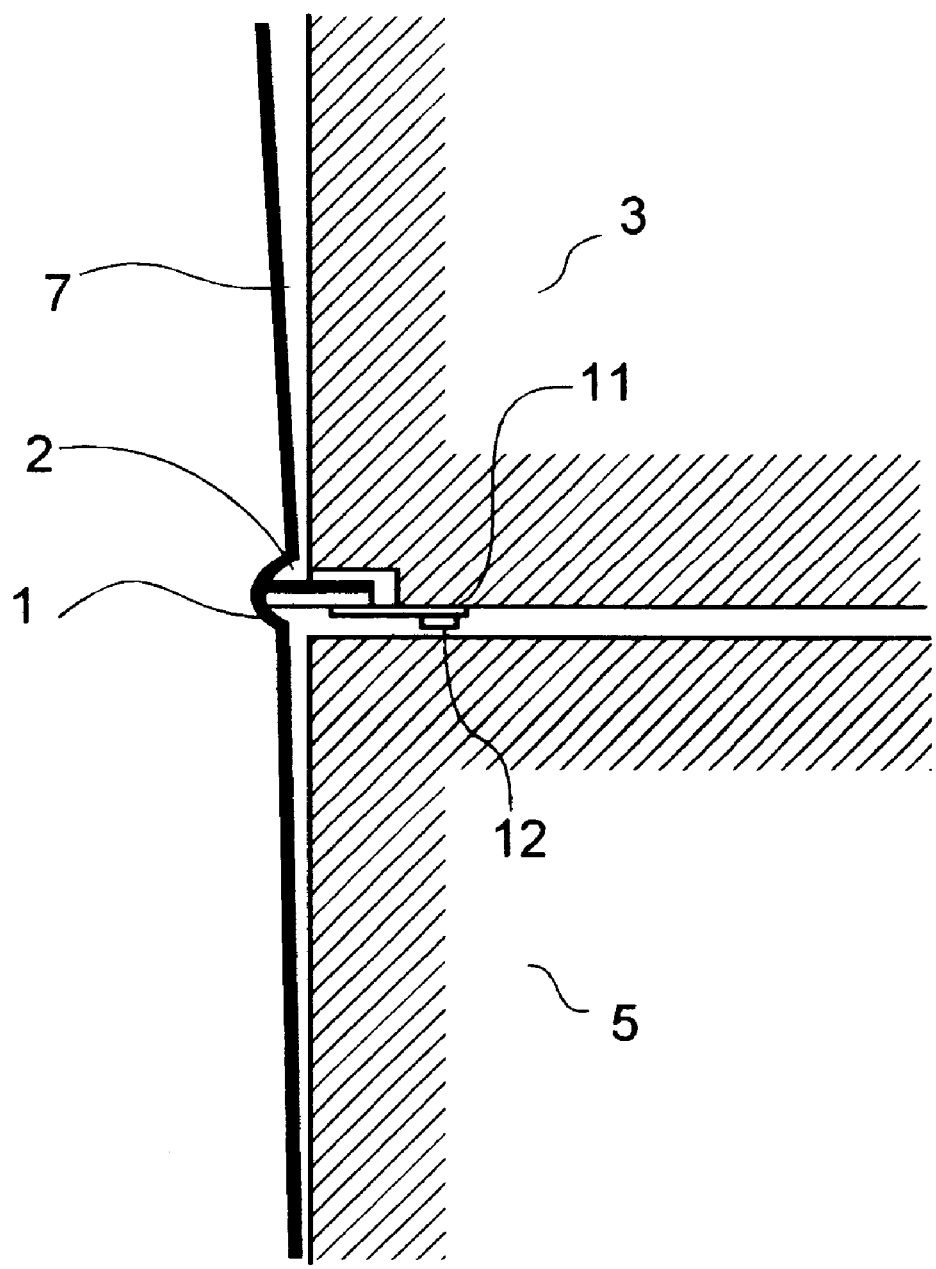
FIG. 16 is a diagram which shows the formation of a magnetic tape along the drum axial direction in the embodiment according to the present invention.

As shown in FIG. 1, the height H1 is defined as the distance along the drum axial direction from the under side of the succeeding head 2 to the adjacent side of the stationary drum 5 and the height H2 is defined as the distance along the drum axial direction from the upper side of the preceding head 1 to the upper side of the drum window 4. As shown in FIG. 16, when these heights are set in the range 0.20 W≦H1≦0.21 W   0.21 W≦H2≦0.22 W 0.22 L≦H1≦0.23 L   0.24 L≦H2≦0.25 L the envelopment of the magnetic tape 7 is optimized in the head top to bottom direction, resulting in a good reproducing output.

And, as shown in FIG. 1, the core width Cw is defined as the width along the rotary axial direction of the tape confronting surface of each of the preceding head 1 and the succeeding head 2. As shown in FIG. 16, when the width is set in the range 9 Cw≦H1≦10 Cw and 10 Cw≦H2≦11 Cw the envelopment of the magnetic tape 7 is optimized in the head top to bottom direction, resulting in a good reproducing output.

The factors related to the head contact described in the above examples have been summarized in FIG. 20. The values shown in FIG. 20 are preferable to realize this invention. That is to say, the recording wavelength is in the range 0.5~0.9 μm, the speed of the rotary drum is in the range 3600~4500 rpm, the tape tension in the running direction is in the range of 100 mN≦T≦150 mN, and the head protrusion is in the range of 20020~20030 μm (20~30 μm from the outer periphery of the rotary drum). And, while the recording/reproducing equipment of a present invention system has been described with reference to a system that uses a magnetic tape of three different thicknesses, as shown in FIG. 20, a favorable reproducing output is gained if the tape thickness is in the range of 6 μm to 15 μm.

According to a present invention, by setting the relation between the size of a magnetic head and the shape of the drum window to a proper ratio, highly efficient rotary drum equipment and recording/reproducing equipment can be obtained.

While the present disclosure has shown and described several embodiments in accordance with the present invention, it is understood that the same is not limited thereto, but is susceptible of numerous changes and modifications as apparent to those skilled in the art, and we therefore do not wish to be limited to the details shown and described herein, but intend to cover all such changes and modifications as are encompassed by the scope of the appended claims.

What is claimed is:

1. A rotary drum equipment that is used for recording/reproducing equipment of a helical scan type, comprising:
   a stationary drum;
   a rotary drum mounted coaxially with said stationary drum;
   a drum window in the form of a rectangular opening in the outer periphery of said rotary drum at a position adjacent said stationary drum;
   a magnetic head assembly installed in said drum window for recording/reproducing a signal to/from a magnetic tape, including a first head arranged in a preceding side in the rotary direction of said rotary drum and a second head arranged in a succeeding side of said drum window;

wherein, the head length L is defined as the distance from the front end of said first head to the back end of said second head and the drum window width W is defined as the distance of said drum window in the rotary direction, said first head and said second head are arranged within said drum window to satisfy the relation 1.15 L≦W≦1.28 L.

2. A rotary drum equipment according to claim 1, wherein said first head and said second head are arranged within said drum window to satisfy the relation 1.15 L≦W≦1.20 L.

3. A rotary drum equipment according to claim 1, wherein said first head and said second head are arranged within said drum window to satisfy the relation 1.16 L≦W≦1.20 L.

4. A rotary drum equipment according to claim 1, wherein, a protrusion P1 is defined as the distance from the rotary center of said rotary drum to the top of the tape confronting surface of said first head and a protrusion P2 is defined as the distance from the rotary center to the top of the tape confronting surface of said second head, said first head and said second head are arranged within said drum window to satisfy the relation 0 μm<(P2−P1)≦4 μm.

5. A rotary drum equipment according to claim 4, wherein said first head and said second head are arranged within said drum window to satisfy the relation 1 μm<(P2−P1)≦3 μm.

6. A rotary drum equipment according to claim 1, wherein, viewing said rotary drum above said stationary drum, a height H1 is defined as the distance along the drum rotation axial direction from the under side of said second head to the upper side of said stationary drum, and a height H2 is defined as the distance along the drum rotation axial direction from the upper side of said first head to the upper side of said drum window, said first head and said second head are arranged within said drum window to satisfy the relation 0.20 W≦H1≦0.21 W, 0.21 W≦H2≦0.22 W, 0.22 L≦H1≦0.23 L, 0.24 L≦H2≦0.25 L.

7. A rotary drum equipment according to claim 1, wherein viewing said rotary drum above said stationary drum, a height H1 is defined as the distance along the drum rotation axial direction from the under side of said second head to the upper side of said stationary drum, and a height H2 is defined as the distance along the drum rotation axial direction from the upper side of said first head to the upper side of said drum window, and further the core width Cw is defined as the width along the rotary axial direction of the tape confronting surface of said first head and said second head, said first head and said second head are arranged within said drum window to satisfy the relation 9 Cw≦H1≦10 Cw, 10 Cw≦H2≦11 Cw.

8. A rotary drum equipment according to claim 1, wherein the recording wavelength λ is in the range of 0.5 μm≦λ≦0.9 μm.

9. A rotary drum equipment according to claim 1, wherein the diameter D of said rotary drum is substantially 40 mm.

10. A rotary drum equipment according to claim 1, wherein the speed of rotation r of said rotary drum is in the range of 3600 rpm≦r≦4500 rpm.

11. A rotary drum equipment according to claim 1, wherein the tension T of the tape in the running direction is in the range of 100 mN≦T≦150 mN.

12. A rotary drum equipment according to claim 1, wherein the core width Cw of said heads in the rotary axial direction is in the range of 50 μm≦Cw≦70 μm.

13. A rotary drum equipment according to claim 1, wherein said magnetic tape is made of a type of metal powder coating.

14. A rotary drum equipment according to claim 1, wherein the width of said magnetic tape is substantially 8 mm.

15. A rotary drum equipment according to claim 1, wherein the thickness b of said tape is in the range of 6 μm≦b≦15 μm.

16. A rotary drum equipment according to claim 15, wherein said tape thickness b is 7.8 or 10 or 13 μm.

17. A rotary drum equipment that is used for a recording/reproducing equipment of a helical scan type, comprising:

a stationary drum;

a rotary drum mounted coaxially with said stationary drum;

a drum window in the form of a rectangular opening in the outer periphery of said rotary drum at a position adjacent said stationary drum;

a magnetic head assembly installed in said drum window for recording/reproducing a signal to/from a magnetic tape, including a first head arranged in a preceding side in the rotary direction of said rotary drum and a second head arranged in a succeeding side of said drum window;

wherein, the head length L is defined as the distance from the front end of said first head to the back end of said second head, and a space S1 is defined as the distance from the front end of said first head to the front end of said drum window, and a space S2 is defined as the distance from the back end of said second head to the back end of said drum window, said first head and said second head are arranged within said drum window to satisfy the relations 0.075 L≦S1≦0.14 L and 0.075 L≦S2≦0.14 L.

18. A rotary drum equipment according to claim 17, wherein said first head and said second head are arranged within said drum window to satisfy the relation 0.075 L≦S1≦0.1 L and 0.075 L≦S2≦0.1 L.

19. A recording/reproducing equipment of a helical scan type, comprising:

a mechanical chassis;

tape drive means for driving a magnetic tape, being mounted on said mechanical chassis;

tape tension control means for giving said magnetic tape a specified tension; and rotary drum equipment for recording/reproducing a signal to/from said magnetic tape;

wherein said rotary drum equipment comprises:

a stationary drum arranged on said mechanical chassis;

a rotary drum mounted coaxially with said stationary drum;

a drum window in the form of a rectangular opening in the outer periphery of said rotary drum at a position adjacent said stationary drum;

a magnetic head assembly installed in said drum window for recording/reproducing a signal to/from said magnetic tape, including a first head arranged in a preceding side in the rotary direction of said rotary drum and a second head arranged in a succeeding side of said drum window;

wherein, the head length L is defined as the distance from the front end of said first head to the back end of said second head and the drum window width W is defined as the distance of said drum window in the rotary direction, said first head and said second head are arranged within said drum window to satisfy the relation 1.15 L≦W≦1.28 L.

20. A recording/reproducing equipment according to claim 19,
wherein said rotary drum equipment is characterized in that said first head and said second head are arranged within said drum window to satisfy the relation 1.15 L≦W≦1.20 L.

21. A recording/reproducing equipment according to claim 19,
wherein said rotary drum equipment is characterized in that said first head and said second head are arranged within said drum window to satisfy the relation 1.16 L≦W≦1.20 L.

22. A recording/reproducing equipment according to claim 19,
wherein said rotary drum equipment is characterized in that, a protrusion P1 is defined as the distance from the rotary center of said rotary drum to the top of the tape confronting surface of said first head and a protrusion P2 is defined as the distance from the rotary center to the top of the tape confronting surface of said second head, said first head and said second head are arranged within said drum window to satisfy the relation 0 μm<(P2−P1)≦4 μm.

23. A recording/reproducing equipment according to claim 22,
wherein said rotary drum equipment is characterized in that said first head and said second head are arranged within said drum window to satisfy the relation 1 μm<(P2−P1)≦3 μm.

24. A recording/reproducing equipment according to claim 19,
wherein said rotary drum equipment is characterized in that, viewing said rotary drum above said stationary drum, a height H1 is defined as the distance along the drum rotation axial direction from the under side of said second head to the upper side of said stationary drum, and a height H2 is defined as the distance along the drum rotation axial direction from the upper side of said first head to the upper side of said drum window, said first head and said second head are arranged within said drum window to satisfy the relations 0.20 W≦H1≦0.21 W, 0.21 W≦H2≦0.22 W, 0.22 L≦H1≦0.23 L, and 0.24 L≦H2≦0.25 L.

25. A recording/reproducing equipment according to claim 19,
wherein said rotary drum equipment is characterized in that, viewing said rotary drum above said stationary drum, a height H1 is defined as the distance along the drum rotation axial direction from the under side of said second head to the upper side of said stationary drum, and a height H2 is defined as the distance along the drum rotation axial direction from the upper side of said first head to the upper side of said drum window, and further the core width Cw is defined as the width along the rotary axial direction of the tape confronting surface of said first head and said second head, said first head and said second head are arranged within said drum window to satisfy the relation 9 Cw≦H1≦10 Cw, 10 Cw≦H2≦11 Cw.

26. A recording/reproducing equipment according to claim 19,
wherein the recording wavelength λ is in the range of 0.5 μm≦λ≦0.9 μm.

27. A recording/reproducing equipment according to claim 19,
wherein the diameter D of said rotary drum is substantially 40 mm.

28. A recording/reproducing equipment according to claim 19,
wherein the number of revolutions r of said rotary drum is in the range of 3600 rpm≦r≦4500 rpm.

29. A recording/reproducing equipment according to claim 19,
wherein the tension T of the tape in the running direction is in the range of 100 m≦T≦150 mN.

30. A recording/reproducing equipment according to claim 19,
wherein the core width Cw of said heads in the rotary axial direction is in the range of 50 μm≦Cw≦70 μm.

31. A recording/reproducing equipment according to claim 19,
wherein said magnetic tape is made of a type of metal powder coating.

32. A recording/reproducing equipment according to claim 19,
wherein the width of said magnetic tape is substantially 8 mm.

33. A recording/reproducing equipment according to claim 19;
wherein the thickness b of said tape is in the range of 6 μm≦b≦15 μm.

34. A recording/reproducing equipment according to claim 33, wherein said tape thickness b is 7.8 or 10 or 13 μm.

35. A recording/reproducing equipment of a helical scan type, comprising:
a mechanical chassis;
tape drive means for driving a magnetic tape;
tape tension control means for giving said magnetic tape a specified tension; and
rotary drum equipment for recording/reproducing a signal to/from said magnetic tape;
wherein said rotary drum equipment comprises:
a stationary drum arranged on said mechanical chassis;
a rotary drum mounted coaxially with said stationary drum;
a drum window in the form of a rectangular opening in the outer periphery of said rotary drum at a position adjacent said stationary drum;
a magnetic head assembly installed in said drum window for recording/reproducing a signal to/from said magnetic tape, including a first head arranged in a preceding side in the rotary direction of said rotary drum and a second head arranged in a succeeding side of said drum window;
wherein, the head length L is defined as the distance from the front end of said first head to the back end of said second head, and a space S1 is defined as the distance from the front end of said first head to the front end of said drum window, and a space S2 is defined as the distance from the back end of said second head to the back end of said drum window, said first head and said second head are arranged within said drum window to satisfy the relations 0.075 L≦S1≦0.14 L and 0.075 L≦S2≦0.14 L.

36. A recording/reproducing equipment according to claim 35,
wherein said rotary drum equipment is characterized in that said first head and said second head are arranged within said drum window to satisfy the relations $0.075 L \leq S1 \leq 0.1 L$ and $0.075 L \leq S2 \leq 0.1 L$.

* * * * *